Nov. 17, 1964    K. J. LAVERONE ETAL    3,157,249
VEHICLE-BLOCKING DEVICE
Filed March 26, 1963
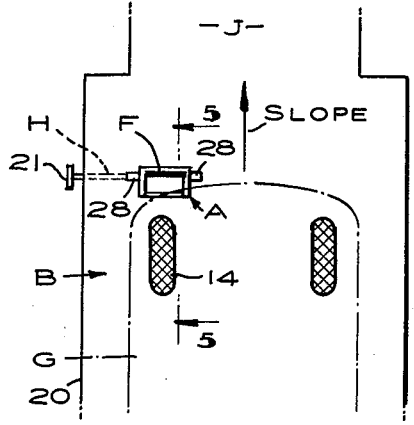
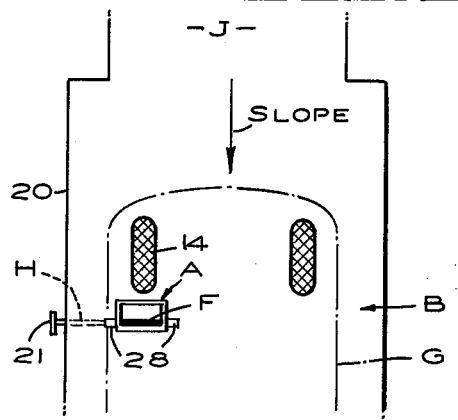
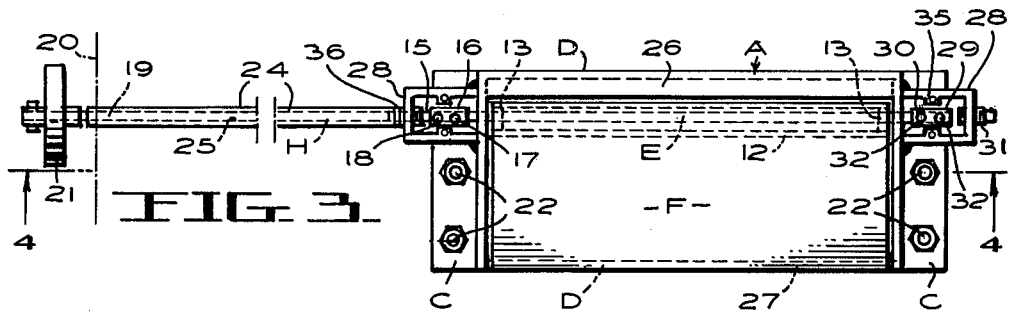
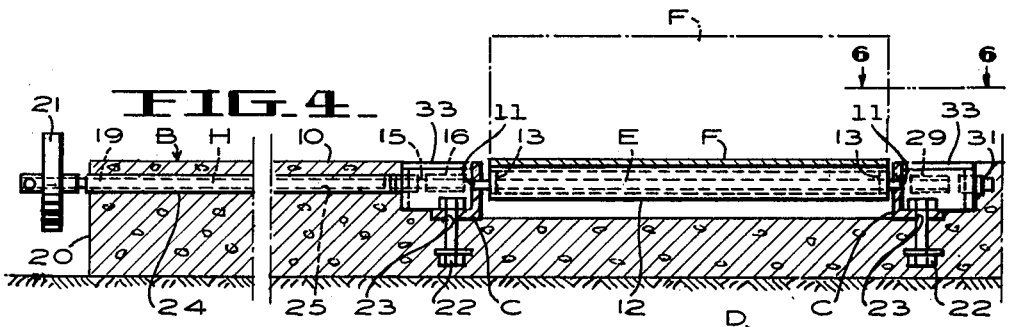
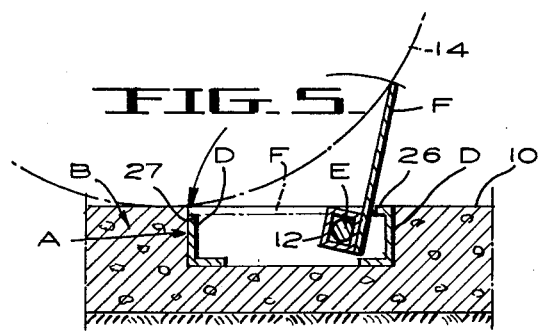
INVENTORS
KENNETH J. LAVERONE
BY  SHELLEY J. SMITH
*Joseph F. Cole*
ATTORNEY

United States Patent Office 3,157,249
Patented Nov. 17, 1964

3,157,249
VEHICLE-BLOCKING DEVICE
Kenneth J. Laverone, P.O. Box 353, San Juan Bautista, Calif., and Shelley J. Smith, Box 877, Sonora, Calif.
Filed Mar. 26, 1963, Ser. No. 268,177
9 Claims. (Cl. 188—32)

The present invention relates to improvements in a vehicle-blocking device. It consists of the combinations, constructions and arrangement of parts, as hereinafter described and claimed.

It is a well known fact that driveways leading to garages may be inclined toward and away from the garages, and thus a vehicle parked in the driveway may accidentally roll from its parked position, causing damage to the vehicle and buildings. Accordingly, it is proposed to provide a vehicle-blocking device that may be readily installed in a driveway, the device including a swingable plate that may be raised to provide an abutment against which a vehicle wheel may engage for arresting movement of the vehicle. Moreover, the plate may be lowered into flush relation with the surface of the driveway for passage of the vehicle wheel thereover.

Another object of this invention is to provide a vehicle-blocking device in which the swingable plate may engage with any selected wheel of a vehicle, either in front or back of the wheel, the device having a supporting frame embedded in the driveway, with an operating shaft for the plate being arranged to extend laterally from the supporting frame in either direction to an operating element, for instance a wheel that may be turned by a person's foot.

Other objects and advantages will appear as the specification proceeds. The novel features of the invention will be set forth in the appended claims.

Drawing

For a better understanding of the invention, reference should be had to the accompanying drawing, forming part of this specification, in which:

FIGURE 1 is a schematic plan view showing the swingable plate of our vehicle-blocking device in raised position and disposed forwardly of the left front wheel of a vehicle, the driveway sloping forwardly toward a garage;

FIGURE 2 is a view similar to FIGURE 1, but with the raised plate being disposed rearwardly of the left front wheel, and the driveway sloping away from a garage.

FIGURE 3 is a top plan view of our wheel-blocking device, with the swingable plate in lowered position;

FIGURE 4 is a sectional view taken along the transverse plane 4—4 of FIGURE 3;

FIGURE 5 is a longitudinal sectional view taken along the plane 5—5 of FIGURE 1; and FIGURE 6 is an enlarged fragmentary plan view as seen from the plane 6—6 of FIGURE 4.

While we have shown only the preferred form of our invention, it should be understood that various changes, or modifications, may be made within the scope of the annexed claims without departing from the spirit thereof.

Detailed Description

Referring now to the drawing in detail, we have shown a supporting frame designated generally at A, which is embedded in and anchored to a driveway B so as to be approximately flush with the surface 10 of the driveway. This frame defines spaced end members C and spaced side members D that extend longitudinally and transversely, respectively, of the driveway.

It will be noted that a journal shaft E is disposed transversely of the driveway B, and is rotatably mounted in bearing openings 11 formed in the longitudinal end members C for turning movement in either direction. A swingable plate F of substantially rectangular outline is secured to the journal shaft E for being turned by and with the latter. The supporting frame is substantially rectangular in shape.

For the purpose of securing the plate F to the journal shaft E, we have disclosed a square tubing 12 through which this shaft extends, the plate being secured to this tubing by welding. A pair of end plates 13 are welded to the opposite ends of the tubing 12, and the journal shaft E is welded to these end plates.

The plate F may be moved into a lowered position to form a cover over the supporting frame A, as shown in FIGURE 3, disposed flush with the surface of the driveway B for passage of a wheel 14 of a vehicle G thereover. Moreover, the plate F may be swung into raised position to provide an abutment against which the vehicle wheel 14 may engage for arresting movement of the vehicle (see FIGURES 1, 2 and 5).

An operating shaft H has an inboard end 15 coupled by a sleeve 16 to a selected end of the journal shaft E. This sleeve is secured to the journal shaft and operating shaft by bolts 17 and 18, respectively (see FIGURE 3). The outboard end 19 of the operating shaft H extends to a predetermined location relative to the driveway B, for example, to a lateral edge 20 thereof.

In order to turn the operating shaft H in either direction and thereby raise and lower the swingable plate F, an operating element 21 is fixed to the outboard end 19 of this shaft. This operating element has been illustrated as being a wheel that may be engaged by a person's foot so as to turn the shaft H in the desired direction.

Any suitable means may be provided for anchoring the supporting frame A in the driveway B. For this purpose, anchor bolts 22 have been shown as extending downwardly through openings 23 formed in the longitudinal end members C (see FIGURE 4).

It will be seen that a pipe 24 is secured to the supporting frame A and is embedded in the driveway so as to extend laterally from this frame. The shaft H extends through a bore 25 of this pipe with a bearing fit and is supported by the pipe for rotation.

As an important structural feature, one of the transverse side members D is provided with a stop 26 against which the swingable plate F may rest, when the latter is raised into vehicle-arresting position, as shown in FIGURE 5. The other transverse side member D has an upper edge 27 against which the swingable plate F may rest for support thereby, when this plate is lowered into cover-forming position over the supporting frame A, as shown by the dot-dash lines in FIGURE 5.

The stop 26 and the upper edge 27 extend along the entire width of the swingable plate F, thereby providing firm support for this plate when in raised and lowered positions, respectively.

As disclosed in FIGURES 1 to 4, inclusive, a pair of boxes 28 are secured to the longitudinal end members C of the supporting frame A. The journal shaft E has its ends extending into these boxes. The sleeve 16, previously mentioned, is disposed in one of the boxes 28, while a second sleeve 29 is secured by a bolt 30 to the other end of the journal shaft and is disposed in the second box. The latter has a removable plug 31 that may be removed, and then the inboard end 15 of the operating shaft H may be inserted through the right-hand box 28 in FIGURES 3, 4 and 6, and connected to the second sleeve 29 by a bolt 32.

Thus means are provided for selectively coupling the operating shaft H to either end of the journal shaft E, whereby the operating shaft may extend laterally from the supporting frame A in either direction. This is an important structural feature, since it will be apparent from FIGURE 1 that when the driveway B slopes towards a garage J the swingable plate F must be arranged ahead of the wheel 14, in order to arrest forward movement of the vehicle G. On the other hand, when the driveway B slopes away from the garage J, as in FIGURE 2, the swingable plate F must be arranged in back of the wheel 14 so as to prevent the vehicle G from rolling down the driveway.

By comparing FIGURES 1 and 2, it will be obvious that the supporting frame A may be turned end-for-end, and the operating shaft and its operating element 21 may be disposed on the same lateral edge of the driveway B. It is for this reason that the operating shaft H may be coupled to either end of the journal shaft E.

In the situation shown in FIGURES 1 and 2, the vehicle-blocking device has been shown as being positioned to engage with the left front wheel of the vehicle G, when the swingable plate F is raised. However, the operating element 21 may be positioned on either lateral side of the driveway B, and the plate F disposed to engage with the front or rear wheels of the vehicle G, and either the left or right wheel. This arrangement is optional, and may be readily accomplished by coupling the operating shaft H to the selected end of the journal shaft E so that the operating element 21 will occupy the desired position relative to the driveway.

As shown in FIGURES 3, 4 and 6, cover plates 33 may be secured over the tops of the boxes 28 by screws 34 that engage with lugs 35 formed on the interiors of these boxes. When these cover plates are removed, access may be had to the sleeves 16 and 29 to permit the shafts E and H to be coupled together or uncoupled. The pipe 24 has a threaded end 36 that may be screwed into an opening in the left-hand box 28 in FIGURE 3. This threaded end may be screwed into the threaded opening in the right-hand box 28, when the plug 31 is removed.

We claim:
1. In a vehicle-blocking device:
(a) a substantially rectangular-shaped supporting frame embedded in and anchored to a driveway so as to be approximately flush with the surface of the driveway;
(b) the supporting frame defining spaced end members and spaced side members that extend longitudinally and transversely, respectively, of the driveway;
(c) a journal shaft disposed adjacent to one of the side members to extend transversely of the driveway, and being rotatably mounted in the longitudinal end members for turning movement in either direction;
(d) a swingable plate of substantially rectangular outline secured to the journal shaft for being turned by and with the latter;
(e) the plate being movable into a lowered position and dimensioned to form a continuous bridging cover over the supporting frame, disposed flush with the surface of the driveway for passage of a vehicle wheel thereover;
(f) the plate being swingable into raised position to provide an abutment against which the vehicle wheel may engage for arresting movement of the vehicle;
(g) an operating shaft having an inboard end removably coupled to a selected end of the journal shaft, and having an outboard end extending to a predetermined location relative to the driveway;
(h) and an operating element secured to the outboard end of the operating shaft, and being operable to turn this shaft in either direction, whereby the swingable plate may be raised and lowered.

2. The vehicle-blocking device, as set forth in claim 1;
(i) and in which one of the transverse side members is provided with a stop against which the swingable plate may rest, when the latter is raised into vehicle-arresting position;
(j) the other transverse side member having an upper edge against which the swingable plate may rest for support thereby, when this plate is lowered into cover-forming position over the supporting frame.

3. The vehicle-blocking device, as set forth in claim 2;
(k) and in which the stop on one of the transverse side members and the upper edge of the other transverse side members extends along the entire width of the swingable plate, thereby providing a firm support for this plate when in raised and lowered positions, respectively.

4. The vehicle-blocking device, as set forth in claim 1;
(j) and in which means are provided for selectively coupling the operating shaft to either end of the journal shaft, whereby the operating shaft may extend laterally from the supporting frame in either direction.

5. The vehicle-blocking device, as set forth in claim 1;
(i) and in which a pipe is secured to the supporting frame and is embedded in the driveway so as to extend laterally from this frame;
(j) the operating shaft extending through a bore of the pipe with a bearing fit and being supported by the pipe for rotation.

6. The vehicle-blocking device, as set forth in claim 1;
(i) and in which a pair of boxes is secured to the longitudinal end members of the supporting frame;
(j) the journal shaft having its ends extending into these boxes;
(k) a sleeve disposed in each box, and being secured to the adjacent end of the journal shaft;
(l) and means for removably coupling the operating shaft to a selected sleeve, whereby the operating shaft may extend laterally from the supporting frame in either direction to the operating element.

7. The vehicle-blocking device, as set forth in claim 1;
(i) and in which the operating element is provided by a wheel that is disposed near a lateral edge of the driveway, this wheel having an upper peripheral portion arranged adjacent to the surface of the driveway in a position to be engaged by a person's foot so as to turn the operating shaft in the desired direction.

8. In a vehicle-blocking device:
(a) a substantially rectangular-shaped supporting frame embedded in and anchored to a driveway so as to be approximately flush with the surface of the driveway;
(b) the supporting frame defining spaced end members and spaced side members that extend longitudinally and transversly, respectively, of the driveway;
(c) a journal shaft disposed adjacent to one of the side members to extend transversely of the driveway, and being rotatably mounted in the longitudinal end members for turning movement in either direction;
(d) a swingable plate of substantially rectangular outline secured to the journal shaft for being turned by and with the latter;
(e) the plate being movable into a lowered position and dimensioned to form a continuous bridging cover over the supporting frame, disposed flush with the surface of the driveway for passage of a vehicle wheel thereover;
(f) the plate being swingable into raised position to provide an abutment against which the vehicle wheel may engage for arresting movement of the vehicle;
(g) an operating shaft having inboard and outboard ends;
(h) an operating element secured to the outboard end of the operating shaft, and being operable to turn this shaft in either direction;
(i) means provided for selectively coupling the inboard end of the operating shaft to either end of the journal shaft, whereby the operating shaft may extend laterally from the supporting frame in either direction;
(j) and a pipe adapted to be secured to either end of the supporting frame and being embedded in the driveway to extend laterally from this frame;

(k) the operating shaft extending through a bore of the pipe with a bearing fit and being supported by the pipe for rotation.

9. The vehicle-blocking device, as set forth in claim 8;

(l) and in which the operating element is provided by a wheel that is disposed near a lateral edge of the driveway, this wheel having an upper peripheral portion arranged adjacent to the surface of the driveway in a position to be engaged by a person's foot so as to turn the operating shaft in the desired direction.

References Cited by the Examiner
UNITED STATES PATENTS

| | | | |
|---|---|---|---|
| 1,009,902 | 6/14 | Brady | 188—63 |
| 2,562,035 | 7/51 | Hileman. | |

ARTHUR L. LA POINT, *Primary Examiner.*

DUANE A. REGER, *Examiner.*